Dec. 11, 1923.  
J. H. BRYAN  
1,477,422  
TRACTOR CLUTCH CONTROL  
Filed April 16, 1921  
2 Sheets-Sheet 1

John H. Bryan,
INVENTOR

BY Victor J. Evans
ATTORNEY

WITNESS:

Dec. 11, 1923.
J. H. BRYAN
1,477,422
TRACTOR CLUTCH CONTROL
Filed April 16, 1921   2 Sheets-Sheet 2
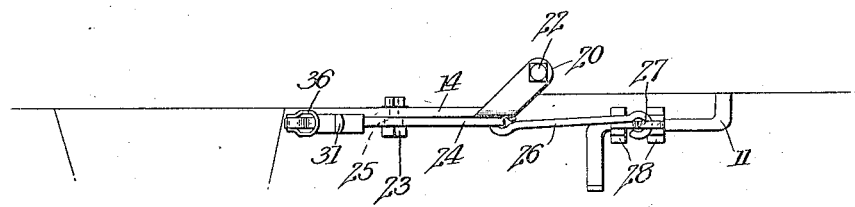
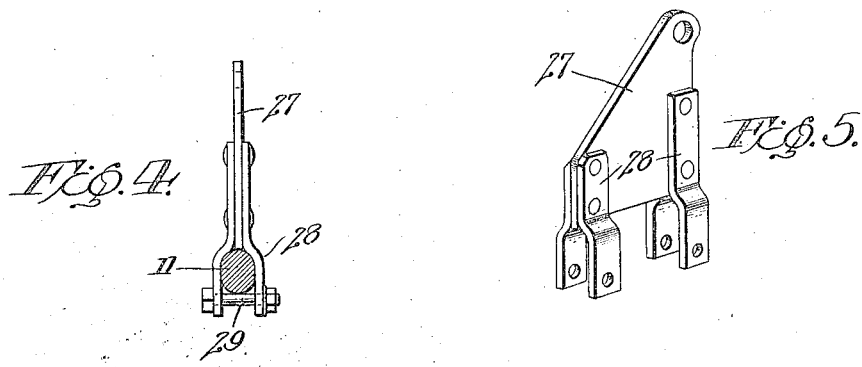
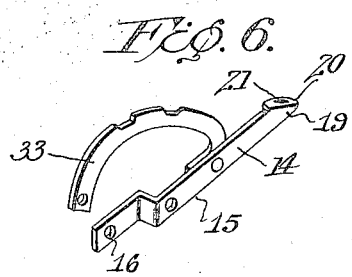
John H. Bryan, INVENTOR
BY *Victor J. Evans* ATTORNEY
WITNESS:

Patented Dec. 11, 1923.

1,477,422

UNITED STATES PATENT OFFICE.

JOHN H. BRYAN, OF MOLINE, KANSAS.

TRACTOR CLUTCH CONTROL.

Application filed April 16, 1921. Serial No. 461,787.

*To all whom it may concern:*

Be it known that I, JOHN H. BRYAN, a citizen of the United States, residing at Moline, in the county of Elk and State of Kansas, have invented new and useful Improvements in Tractor Clutch Controls, of which the following is a specification.

This invention relates to improvements in tractors and has for an object the provision of means especially designed for application to "Fordson" tractors, for holding the clutch in disengaged position.

Another object of the invention is the provision of a device of this character which may be secured to the clutch operating pedal or lever for the purpose above stated, without interfering with the operation of the clutch in the usual manner.

Another object is the provision of a clutch lever lock which is positive and convenient in operation and which may be applied to the tractor without making changes or alterations in the latter.

With the above and other objects in view, the invention further includes the following novel features and details of construction, to be hereinafter more fully described, illustrated in the accompanying drawings and pointed out in the appended claim.

In the drawings:—

Figure 3 is a fragmentary plan view with the parts in the position shown in Figure 1.

Figure 4 is a detail section through the clutch lever with the attaching clamp in position thereon.

Figure 5 is a detail perspective view of the attaching clamp.

Figure 6 is a like view of the bracket and the notched sector attached thereto.

Figure 1:
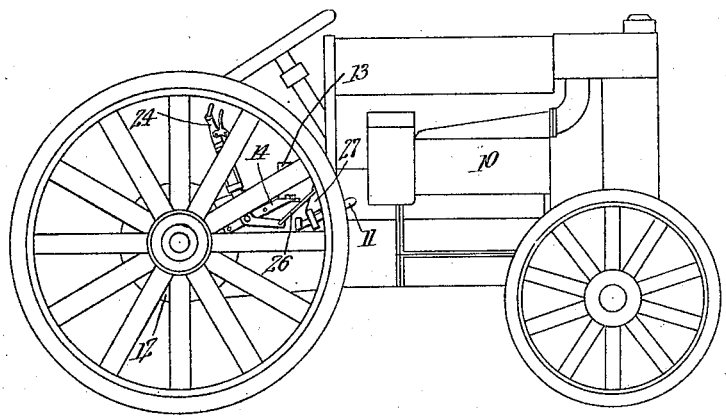
Figure 1 is a side elevation of a "Fordson" tractor with the invention applied thereto and the clutch lever shown in normal or engaged position.

Referring in detail to the drawings, wherein like characters of reference denote corresponding parts, the reference character 10 indicates generally a tractor of the "Fordson" type which includes a lever 11 which is operated by the foot of the driver for controlling the position of the clutch. The numeral 12 indicates the differential housing and 13 the tool box, which is a part of the usual tractor equipment.

Secured to the frame which supports the engine of the tractor is a bracket 14 which is offset at one end as shown at 15 and has its extremity provided with an opening 16. This end of the bracket 14 is adapted to engage over a bolt 17 located just in front of the differential housing 18, the bolt 17 being also a part of the usual tractor equipment. The opposite end of the bracket 14 is given a quarter turn and is disposed at on obtuse angle as shown at 19 to provide a substantially horizontal extension 20 having an opening 21 therein. The opening 21 is adapted to receive a cap screw 22 which enters the engine block. By this means the bracket (which carries the hand lever, to be later described) is secured to the tractor without making any changes or alterations in the tractor structure.

Pivotally mounted upon the bracket 14 as shown at 23, is a hand operating lever 24. The bolt 23 which forms a pivot for this lever is provided with an enlarged or shoulder portion 25 upon which the lever 24 is mounted, while the reduced portion of the bolt extends through the opening in the bracket 14, within which it is secured. One end of the hand lever 24 has connected thereto one end of a link 26, whose opposite end is pivotally secured to a clamp 27. This clamp includes spaced pairs of ears 28 which are adapted to receive the clutch lever 11 and to be secured upon opposite sides of said lever by means of bolts or similar fastening devices 29.

The hand lever 24 is provided with a spring actuated dog 30, which is operated by a handle 31. This dog is adapted for engagement within a notch 32 provided in a segment 33, the latter being secured to the bracket 14 upon the pivot bolt 23 and an additional bolt 34. If desired, the bracket 33 may be provided with an additional opening 35 for the passage of additional fastening means. The hand lever 24 has pivotally secured to its upper end a loop 36 which is adapted to engage over the handle 31 of the spring actuated dog 30 so as to hold the latter retracted.

Figure 2:
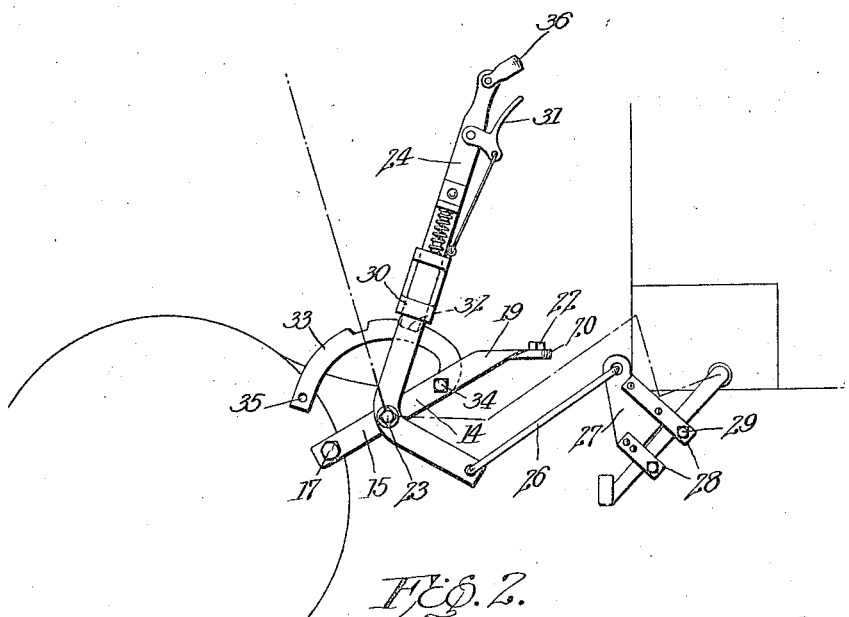
Figure 2 is a similar view with the clutch lever in disengaged position.

In the use of the invention, when the tractor is utilized for the purpose of operating a machine through its usual belt and pulley connection and it is desired to disengage the clutch to stop the operation of said machine without stopping the operation of the tractor engine, the lever 24 is thrown forward so that its lower end moves in a rearward and downward direction and through the medium of the link 26 forces the clutch lever 11 to the position shown in Figure 2. When in this position the spring dog 30 will engage the notch 32 of the segment 33 so as to hold the clutch against accidental reengagement. If desired, the dog 30 may be held in disengaged position by engaging the loop 36 over the lever 31 which controls the operation of the dog. When in this position, the clutch lever 11 may be operated in the usual manner without removing or disengaging the clamp 27 from the lever. This permits the tractor to be operated in the usual manner.

It will be seen from the foregoing description and accompanying drawings, that the invention provides an exceedingly simple and efficient clutch lever lock for tractors of the type stated, which may be easily secured to or removed from the tractor and which, when in position, will permit the operation of the clutch in the usual manner.

The invention is susceptible of various changes in its form, proportions and minor details of construction and the right is herein reserved to make such changes as properly fall within the scope of the appended claim.

Having described the invention what is claimed is:—

The combination with a tractor clutch lever, of an upwardly and forwardly extending arm, means for securing one end of the arm to the tractor, a notched segment having one end secured to the arm and its opposite end secured to the tractor, a hand lever pivotally mounted upon the arm, a spring latch carried by the hand lever for engagement with the notched segment to hold said lever in position and means operatively connecting the hand lever to the clutch lever, whereby the latter may be operated.

In testimony whereof I affix my signature.

JOHN H. BRYAN.